United States Patent [19]
Li et al.

[11] Patent Number: 5,434,754
[45] Date of Patent: Jul. 18, 1995

[54] LIGHT MANIFOLD

[75] Inventors: John X. Li, Farmington Hills; Jeffrey A. Erion, Plymouth, both of Mich.

[73] Assignee: Ford Motor Company, Dearborn, Mich.

[21] Appl. No.: 174,932

[22] Filed: Dec. 27, 1993

[51] Int. Cl.⁶ ............................................. F21V 7/04
[52] U.S. Cl. ........................................ 362/31; 362/32; 362/80; 362/299; 362/300; 362/329
[58] Field of Search ............ 362/61, 80, 32, 31, 362/297, 298, 348, 347, 330, 300, 299, 301, 308, 309, 310, 311, 328, 329, 337, 336, 340

[56] References Cited

U.S. PATENT DOCUMENTS

| | | | |
|---|---|---|---|
| 1,419,482 | 6/1922 | Wood. | |
| 1,589,664 | 6/1926 | Ryland. | |
| 1,815,751 | 7/1931 | Whalen. | |
| 1,995,012 | 3/1935 | Rivier. | |
| 2,198,014 | 4/1940 | Ott. | |
| 2,229,693 | 1/1941 | Dietrich. | |
| 2,724,766 | 11/1955 | Hawley et al. | 362/32 X |
| 3,900,727 | 8/1975 | Hutz. | |
| 4,152,752 | 5/1979 | Niemi | 362/32 |
| 4,241,382 | 12/1980 | Daniel | 362/32 |
| 4,389,698 | 6/1983 | Cibie | 362/32 |
| 4,408,266 | 10/1983 | Sclippa | 362/297 |
| 4,417,300 | 11/1983 | Bodmer | 362/304 |
| 4,432,039 | 2/1984 | Cibie | 362/31 |
| 4,456,948 | 6/1984 | Brun | 362/268 |
| 4,494,176 | 1/1985 | Sands et al. | 362/297 |
| 4,523,262 | 6/1985 | Shinkai | 362/214 |
| 4,536,834 | 8/1985 | Sands et al. | 362/303 |
| 4,556,928 | 12/1985 | Tysoe | 362/268 |
| 4,644,455 | 2/1987 | Inglis et al. | 362/309 |
| 4,654,758 | 3/1987 | Szekacs | 362/61 |
| 4,740,871 | 4/1988 | Dilouya | 362/80 |
| 4,755,918 | 7/1988 | Pristash et al. | 362/301 |
| 4,765,701 | 8/1988 | Cheslak | 362/32 X |
| 4,794,493 | 12/1988 | Luciani | 362/61 |
| 4,803,601 | 2/1989 | Collot et al. | 362/80 |
| 4,811,172 | 3/1989 | Davenport et al. | 362/61 |
| 4,868,718 | 9/1989 | Davenport et al. | 362/32 |
| 4,868,723 | 9/1989 | Kobayashi | 362/80 |
| 4,883,333 | 11/1989 | Yanez | 362/32 X |
| 4,916,592 | 4/1990 | Sultan et al. | 362/80 |
| 4,956,759 | 9/1990 | Goldenberg et al. | 362/297 |
| 5,001,609 | 3/1991 | Gardner et al. | 362/32 |
| 5,058,985 | 10/1991 | Davenport et al. | 362/32 X |
| 5,184,883 | 2/1993 | Finch et al. | 362/61 X |
| 5,365,412 | 11/1994 | Koppolu et al. | 362/61 X |

FOREIGN PATENT DOCUMENTS

| | | | |
|---|---|---|---|
| 0364228 | 4/1990 | European Pat. Off. | |
| 2710553 | 9/1978 | Germany. | |
| 4342627 | 11/1992 | Japan | 362/32 |
| 5109301 | 4/1993 | Japan | 362/32 |
| 2066444 | 7/1981 | United Kingdom | 362/32 |
| 2180051 | 3/1987 | United Kingdom. | |
| 2238109 | 5/1991 | United Kingdom | 362/32 |

*Primary Examiner*—Ira S. Lazarus
*Assistant Examiner*—Thomas M. Sember
*Attorney, Agent, or Firm*—Kevin G. Mierzwa; Roger L. May

[57] ABSTRACT

A manifold for use on a vehicle utilizing light from a remote light source. The manifold includes bi-focal parabolic reflector which collects and collimates light from the remote light source which is transmitted to the bi-focal parabolic reflector through a light guide, such as a fiber optic light pipe. Light from the reflector is reflected outward through a plurality of reflective facets to form a light beam.

12 Claims, 2 Drawing Sheets

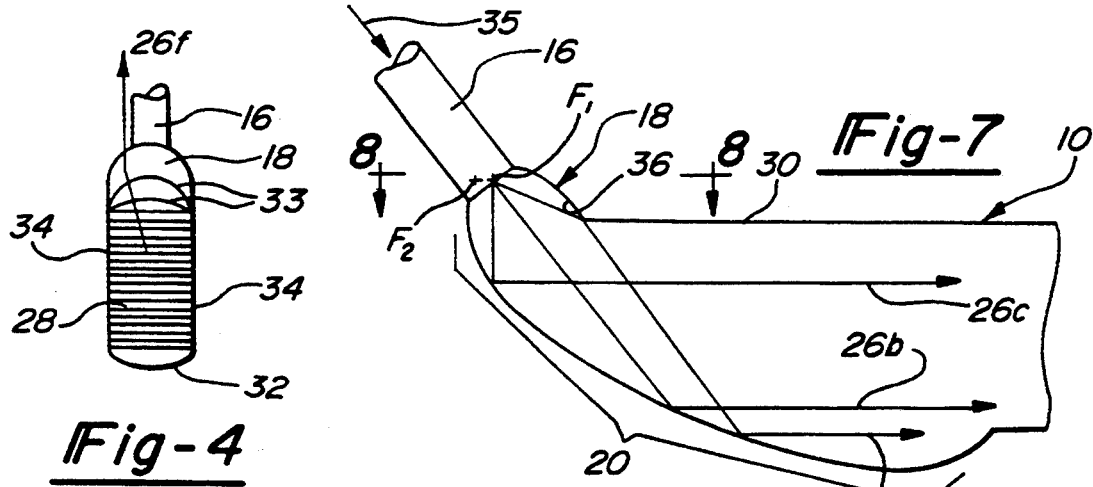
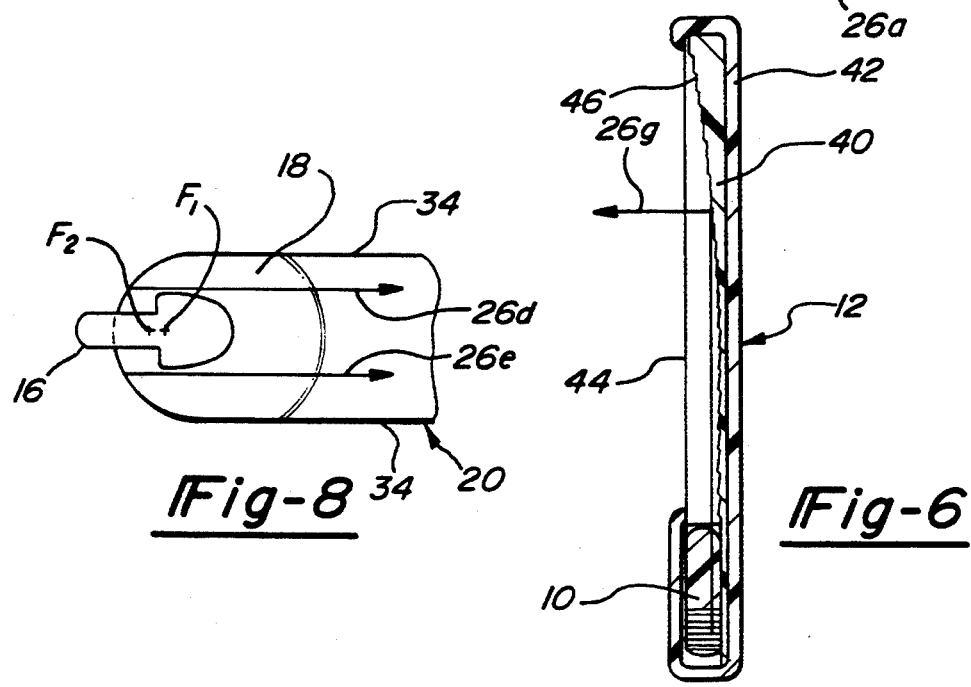
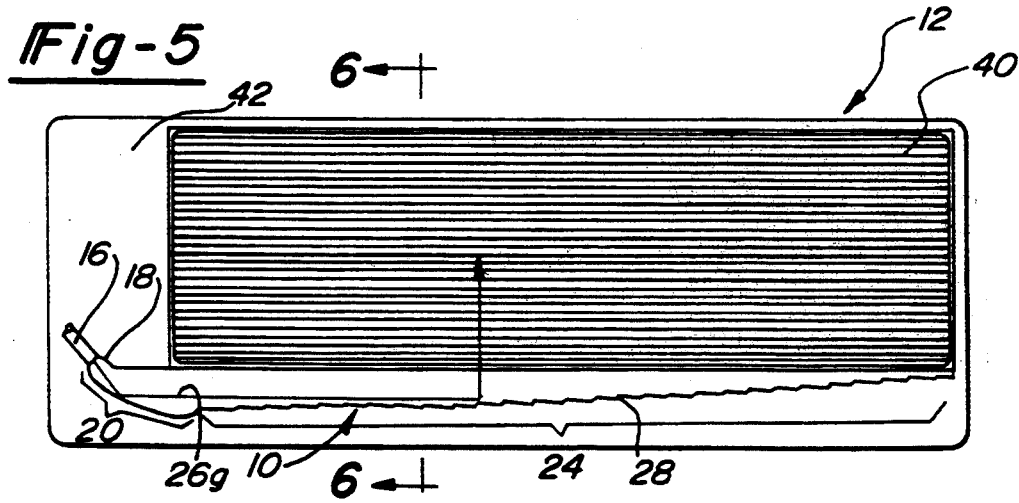

LIGHT MANIFOLD

BACKGROUND OF THE INVENTION

1. Field of the Invention

The present invention relates generally to a light transmission system for use on a vehicle and more specifically to a light manifold for use in combination with a reflector to form a vehicle taillight.

2. Description of the Related Art

Conventional light transmission systems used for vehicle headlights or taillights typically use a bulb and reflector system. In a bulb and reflector system, a filament of the bulb is placed at or near a focal point of a parabolic reflector. The light emitted by the bulb filament is collected by the reflector and reflected outward to form a light beam. A lens is used to shape the light beam into a specified pattern to satisfy vehicle lighting standards regulations. Typically, in an automotive application a conventional bulb and reflector system collects and reflects only thirty percent of the light emitted from the bulb filament.

Bulb and reflector systems have several disadvantages, including aerodynamic and aesthetic styling; e.g., the depth of the reflector along its focal axis and the height of the reflector in directions perpendicular to the focal axis have greatly limited attempts at streamlining vehicle contour. Additionally, the thermal energy given off by the bulb during operation must be considered and the size of the reflector as well as the material used in its construction vary depending upon the amount of thermal energy generated by the bulb filament. Decreasing the size of the reflector requires use of materials with high thermal resistivity for the reflector.

One approach to developing a headlight for use with the newer streamlined body designs is proposed in U.S. Pat. No. 4,432,039 which discloses an elliptical reflector used to concentrate and focus light on a light bar having a plurality of reflective facets. While this approach may be useful, a certain portion of the light from the reflector escapes reflection at the facets, thus lowering the efficiency of the system. Additionally, such a headlight system requires the use of lens optics to focus the light reflected by the facets.

Thus, there is a need in the art for an efficient light manifold which accommodates both thermal considerations and the space limitations dictated by the vehicular aerodynamic and styling requirements.

SUMMARY OF THE INVENTION

Accordingly, the present invention is a unique and efficient light manifold for use in vehicle lighting. In general, the light manifold includes a remote light source having a light pipe connected thereto. The light pipe feeds light into the manifold. The manifold includes a semi-parabolic shaped reflector section and a light emitting section including a plurality of facets. Light collimated by the semi-parabolic shaped reflector section is received and reflected outward by the facets.

One advantage of the present invention is that low profile and high efficient lighting systems can be developed, allowing a designer greater latitude with respect to aerodynamic and aesthetic styling. Additionally, the bulb filament and the associated thermal energy are contained at a remote light source. Only the light energy is transmitted to the illuminator. Any design requirements due to thermal considerations or concerns may now be eliminated. Further advantages of the present invention include more available lumens for a given light source and package size, allowing greater design freedom and control of beam pattern intensity and distribution. Finally, the present invention provides an illuminator which is simpler to manufacture, package and assemble.

BRIEF DESCRIPTION OF THE DRAWINGS

FIG. 4 is a side view of the manifold of FIG. 1.

FIG. 5 is a front view of the taillight of FIG. 1.

FIG. 6 is a side view of the taillight of FIG. 1.

FIG. 7 is an enlarged view of a portion of the manifold in a circle 7—7 of FIG. 2.

FIG. 8 is a sectional view taken along line 8—8 of FIG. 7.

DESCRIPTION OF THE PREFERRED EMBODIMENT(S)

Figure 1:
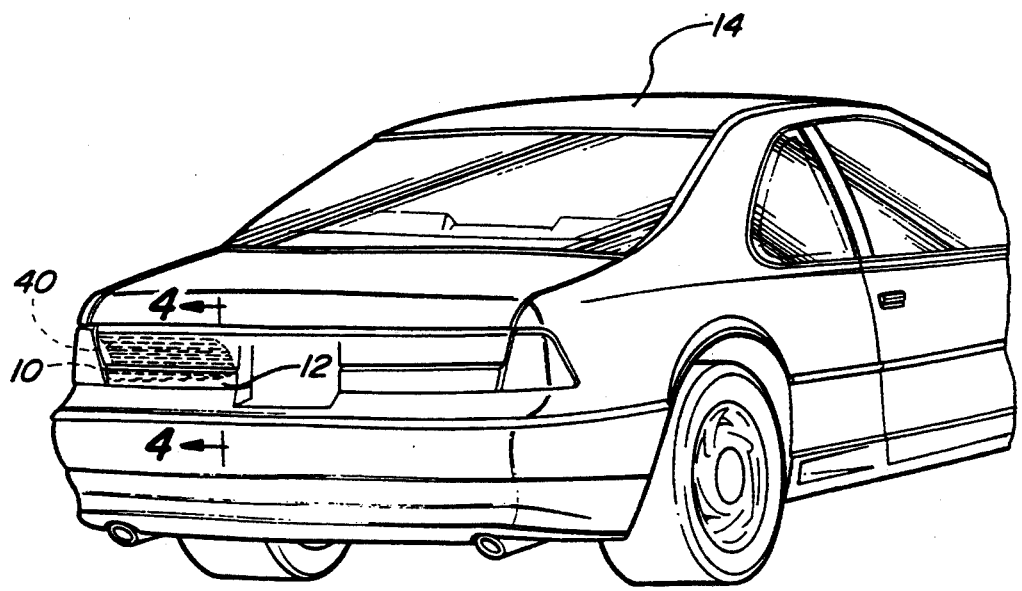
FIG. 1 is a perspective view of a light manifold according to the present invention, illustrated in combination with a reflector to form a vehicle taillight.

Turning now to the drawings and more particularly to FIG. 1, a manifold 10 is shown used in combination with a reflector 40 to form a taillight 12 on a vehicle 14.

Figure 2:
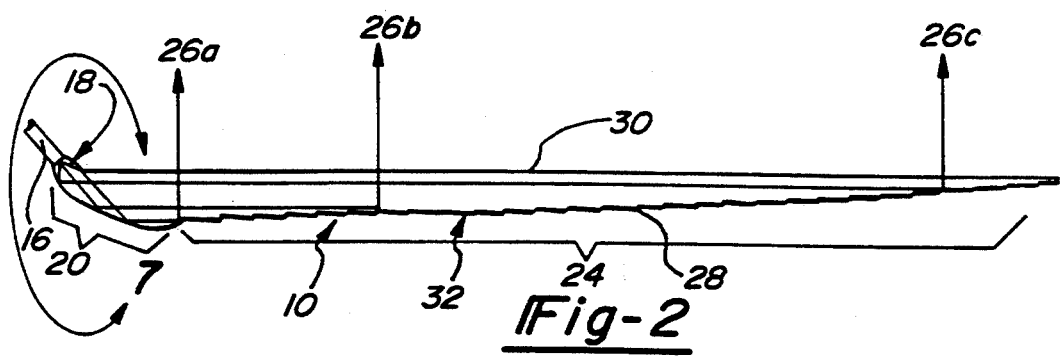
FIG. 2 is a front view of the manifold of FIG. 1.
Figure 3:
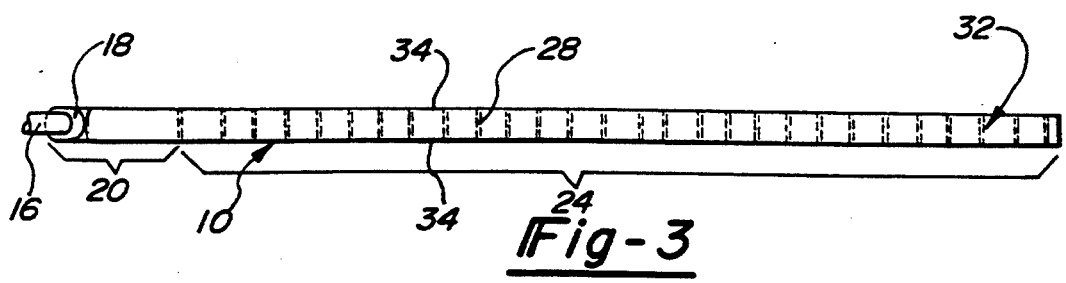
FIG. 3 is a top view of the manifold of FIG. 1.

Referring now to FIGS. 2-5, the manifold 10, according to the present invention, is shown. The manifold 10 receives light from a fiber optic light pipe 16 which transmits light from a remote light source (not shown) to a NIO (non-imaging optics) collimator 18. Non-imaging optics do not require that the emitting surface be imaged onto the viewing plane and thus provide greater design freedom. The manifold 10 includes a bifocal reflector section 20 having a semi-parabolic shape. The reflector section 20 is bi-focal in that it has two separate and distinct focal points $F_1$, $F_2$ (see FIGS. 7-8). The purpose and position of the focal points $F_1$, $F_2$ is set forth in greater detail below. A focal point is that point at which light rays emanating from the point are reflected by a mirror as parallel rays of lights or conversely that point at which parallel rays of light meet after being reflected by a mirror. It should be appreciated that the focal points $F_1$, $F_2$ of the reflector section 20 are positioned near the end of the NIO collimator 18 to collect the light rays 26 exiting the light pipe 16 and NIO collimator 18. As shown in FIGS. 2-3 the reflector section 20 collimates the light rays 26a, 26b, 26c towards an emitter section 24. The emitter section 24 is typically a solid body having a front face 30, a rear face 32 and parallel and planar side surfaces 34. An array of reflective facets or surfaces 28 are position on the rear face 32 and receive the light rays 26a, 26b, 26c collimated by the reflector section 22. The reflective facets 28 redirect the light rays 26a, 26b, 26c outward through the front face 30 of the emitter section 24 as a light beam.

Referring to FIGS. 7-8 an enlarged view of the collimator 18 is shown. The collimator 18 is used to reduce the spread angle of the light rays 26a, 26b, 26c emitted from the light pipe 16 and received by the reflector section 20. As shown in FIG. 7, the collimator 18 works in cooperation with the reflector section 20 to capture and direct additional light energy towards the facets 28 thus increasing the output of the manifold 10. The angle of the light rays emitted from the light pipe 16 is dependant upon the type of light pipe 16 used and the angle at which light is introduced into the light pipe 16. In the present embodiment the light pipe 16 has an acceptance angle of 40°. The light pipe 16 terminates at the first focal point ($F_1$) of the reflector section 20. Thus, all of the light rays emitted from the light pipe 16 contacting the reflector section 20 are reflected outward as parallel rays of light 26b, 26c. In order to reduce the overall size of the manifold 10, the collimator 18 is used to capture the high angle light rays 26a exiting toward the front face 30 of the manifold 10. In the present embodiment the collimator 18 is parabolic shaped having a reflective surface 36 and a focal point positioned coincidental with the focal point ($F_1$) of the reflector section 20. By having a focal axis parallel to the longitudinal axis 35 of the light pipe 16, the high angle light rays 26a strike the surface 36 of the colliminator 18 and are directed forward in a direction parallel to the longitudinal axis 35 of the light pipe 16 whereby they are reflected by reflector section 20 toward the facets 28. Because the light emanating from the collimator 18 is not emitted at the first focal point ($F_1$) the light rays 26a are seen by the reflector section 20 as a secondary source. Thus, there will be a certain degree of spreading due to the fact that the light rays 26a striking the reflective facets 28 will not be parallel to the light rays emitted from the light pipe 16 at the first focal point $F_1$ and reflected by the reflector section 20. Spreading is necessary to eliminate a tiger stripe effect, i.e. assuming each of the light rays 26a, 26b, 26c is emitted at the first focal point $F_1$ the light rays would all be parallel and after striking the reflective facets 28 would be reflected outward in parallel columns. Thus, the light would be visible only at the facets 28 themselves, i.e. a striped effect. Utilization of the coliminator 18 increases the efficiency of the light manifold 10 and provides a certain amount of spreading, approximately 7°, which distributes light over the entire front face 30 of the manifold 10.

Referring now to FIG. 8, a bi-focal reflector section 20 is shown. The bi-focal surface collimates the low angle components of light exiting from the light pipe 16. In the disclosed embodiment the bi-focal reflector section 20 is formed by a bi-focal parabolic surface. In a plane parallel the length of the manifold 10, the focal point ($F_1$) is at the center of the light pipe 16. The focal length selected is the largest possible to utilize the available space, for the manifold 10, to its maximum extent. In a plane perpendicular to the plane set forth above, a shorter focal length ($F_2$) is used to create a second parabolic surface to capture and collimate additional light. As shown in FIG. 8, the reflector section 20 has a first focal point ($F_1$) in the plan or front view and has a second focal point ($F_2$) in the cross section or top view. The focal length, i.e. distance from the focal point to the vertex, of the second focal point ($F_2$) is reduced to capture more light rays and increase the efficiency of the device. As shown in FIG. 8, the light rays 26d, 26e emitted from the light pipe 16 at the second focal point ($F_2$) are collimated in a direction parallel to the parallel and planar side surfaces 34 of the manifold 10. It should be appreciated that the combination of parabolic shaped surfaces that form the reflector section 20 collect and collimate light emitted from the light pipe 16.

Turning once again to FIG. 2, the manifold 10 is, preferably, made from a transparent, solid piece of plastic such as acrylic and utilizes the principle of total internal reflection (TIR) to reflect light at the facets or surfaces 28. Other transparent materials such as polycarbonate may also be used. For total internal reflection of light rays 26 to occur at the facets 28, the incidence angle $\theta$, i.e. the angle of the facet with respect to the light ray 26 in the instant case $\theta = 45°$, must be greater than the critical angle $\theta_c$ given by the equation $$\theta_c = \sin^{-1}(n_1/n_2)$$

where $n_1$ is the index of refraction of the surrounding medium (in this case air), and $n_2$ is the index of refraction of the manifold medium. If an acrylic is used as the material for the manifold, then $n_1 = 1.0$, $n_2 = 1.489$ and $\theta_c = 41°$. Thus, an incidence angle $\theta$ of 45° for the facets 28 would exceed the critical angle $\theta_c$ and provide total internal reflection of the light rays 26a, 26b, 26c. While total internal reflection is the preferred form of reflecting the light rays, the facets 28 may also be coated with a reflective or mirrorized coating to reflect the light rays. Additionally the facets 28 may have a curved or complex surface to further direct the light rays 26 to form or shape a desired beam pattern.

Not all of the light rays emitted from the light guide are collimated by the reflector section 20. If the light rays are not collimated spreading will occur. While it is desirable to have spreading in the plane of the manifold 10, in most cases it is not desirable to have the thickness of the light beam formed by the manifold 10 exceed the thickness of the manifold, i.e. the distance between the parallel and planar side surfaces 34 of the manifold 10. The most efficient use of the manifold 10 is made when the light rays 26 emitted from the emitter section are emitted as substantially parallel rays of light. In the preferred embodiment the front face 30 (see FIG. 4) is a curved or arcuate surface to redirect and collimate the light rays 26f exiting the emitter section of the manifold 10. A greater curvature 33 is necessary at the start or beginning portion of the emitter to reduce the spread. The curvature 33 at the end of the emitter section 24 is reduced as the light is already substantially collimated, i.e. parallel to the focal axis of the reflector section 20 when it reaches the end of the emitter section 24.

Referring now to FIGS. 5 and 6, a taillight 12 suitable for use with an automotive vehicle is shown. The taillight 12 is formed of a multi-faceted reflector 40 positioned in a reflector housing 42. A lens 44, typically a colored piece of acrylic material, covers and protects the multi-faceted reflector 40. In the preferred embodiment, a manifold 10 is placed adjacent the multi-faceted reflector 40 and transmits the light emitted from the light pipe 16 to the multi-faceted reflector 40. As previously set forth, the light rays 26 exit from the emitter section 40 as substantially parallel rays of light. The rays 26 are then reflected from the surface of the multi-faceted reflector 40 outward through the lens 44 as visible light into the required photometric zones. The direction of the light rays reflected from the multi-faceted reflector 40 is controlled by the shape or configuration of the multi-faceted reflector 40. If necessary, a fluted or prismatic lens may be used to direct the reflected light into a specified pattern. It should be appreciated that the angle or positioning of the facets 46 of the multi-faceted reflector 40 with respect to the light rays emanating from the manifold 10 may be adjusted to properly direct the light to the required areas. While a multi-faceted reflector 40 is shown, a smooth curved or complex reflector may be used depending upon the profile or light distribution pattern required.

It should be appreciated that the manifold 10 provides a means in which substantially all of the light rays 26 emitting from the light pipe 16 are captured and collimated by the reflector section 20 whereby all of the collimated light is reflected from the facets 28 outward as useable illuminating light. Such a system allows for the development of low profile and highly efficient lighting systems. It should also be appreciated that by changing the arrangement, position, or surface configuration of the facets a variety of styling profiles and beam patterns may be developed allowing better design and freedom for lighting patterns, intensities and distribution.

It can be seen that the manifold 10 provides the designer with the ability to blend the taillight with the lines of the vehicle and generate a very thin tail lamp package and thereby achieving a very aerodynamic and aesthetically appearing design. While the present invention is shown in use as a vehicle taillight, it may also be used in vehicle headlights, operating lights and interior lights.

What is claimed is:

1. A manifold for transmitting light from a light source comprising:
    a semi-parabolic reflector section receiving light from said light source and including a focal axis;
    an emitter section having a solid body with an elongated front face and an elongated rear face;
    wherein said semi-parabolic reflector section is connected and positioned at an angle to said front and rear faces, said elongated rear face including an array of reflective facets extending a length of said elongated rear face, said semi-parabolic reflector section collimating said light such that said light is reflected between and substantially parallel to said front and rear faces, each facet skewed with respect to said collimated light such that the facets redirect said light outward substantially throughout a length of said elongated front face;
    wherein said elongated front face comprises a curved surface.

2. A manifold as set forth in claim 1 including a light pipe for transmitting light from said light source to said semi-parabolic section.

3. A manifold as set forth in claim 1 wherein said solid body is made of a transparent material having a critical angle less than 45 degrees.

4. A manifold as set forth in claim 1 wherein at least one of said facets has a planar surface.

5. A manifold as set forth in claim 1 wherein at least one of said facets has a complex surface.

6. A manifold as set forth in claim 1 wherein said facets each have a planar surface positioned at an angle of 45° relative to the focal axis of said semi-parabolic reflector section.

7. A manifold as set forth in claim 3 wherein said transparent material is acrylic having a critical angle less than 45°.

8. A lighting system comprising:
    a light source for transmitting light;
    a manifold receiving light from said light source, said manifold including a collimator having a focal axis and collimating a portion of said light received from said light source;
    a reflector positioned adjacent said collimator and receiving the light from said collimator and said light source, said reflector redirecting said light in parallel rays at an angle to said focal axis;
    said manifold further including a front and rear face, said collimator reflects a light between and substantially parallel said front and said rear face, said rear face comprising a plurality of reflective facets positioned oblique to said parallel rays of light for receiving and redirecting said light outward through said front face;
    wherein said front surface of said manifold is a curved surface.

9. A lighting system as set forth in claim 8 wherein said manifold is formed of a material having an index of refraction such that the critical angle when the material is disposed in air is less than 45°.

10. A lighting system as set forth in claim 8 wherein said facets comprise planar surfaces positioned at an angle of 45° with respect to said parallel rays of light.

11. A lighting system as set forth in claim 8 wherein said reflective facets have reflective surfaces, said reflective surfaces being complex surfaces.

12. A lighting system as set forth in claim 8 wherein said collimator includes a semi-parabolic shaped reflector.

* * * * *